United States Patent Office 3,555,642
Patented Jan. 19, 1971

3,555,642
METHOD OF PRODUCING AN IMPREGNATED ELECTRICAL CAPACITOR
Horst Hagedorn, Munich, Germany, assignor to Siemens Aktiengesellschaft, Erlangen, Germany, a corporation of Germany
No Drawing. Filed July 15, 1969, Ser. No. 841,972
Claims priority, application Germany, July 22, 1968, 1,764,704
Int. Cl. H01g 13/00
U.S. Cl. 29—25.42        7 Claims

ABSTRACT OF THE DISCLOSURE

A method of producing an electrical capacitor (A.C.) by controlling the rate of impregnation by a dielectric impregnating agent (i.e., an oil) into a dielectric film (paper or plastic) of an electrical capacitor by subjecting the dielectric film to a heat tempering procedure (at about 100 to 150° C.) to decrease the swelling capacity of the dielectric while simultaneously increasing the absorption thereof prior to impregnation at room temperature. After impregnation, the dielectric films are re-tempered to distribute the impregnating agent within the dielectric film and expand the film to eliminate any air space within the capacitor.

---

The invention relates generally to a method of producing an electrical capacitor and more particularly to the method of producing electrical capacitors having a dielectric film impregnated with an impregnating agent.

Conventional electrical capacitors, particularly those adapted for A.C. operation, are impregnated with dielectric fluids in order to fill cavities within the capacitor body, since otherwise such cavities lead to static or brush discharge. The cavities are found, for example, between surfaces of dielectric films and plates, as these surfaces are never completely smooth. Further, crevices, pores, etc., exist in the dielectric films. For example, a paper foil has a great number of such pores while a plastic foil has comparatively few. Of course, such pores, just as air gaps between capacitor elements (plates) and the dielectric films, must also be eliminated and/or filled with an impregnating agent.

The breakdown strength of impregnating agents are small as compared to that of dielectric foils, particularly plastic foils. Thus, if a certain field strength in a particular capacitor is exceeded, a partial breakdown occurs in the impregnating composition, especially in the space between the plate and the dielectric foil. Such partial breakdown causes the release of a gas from the impregnating agent, i.e., an oil. Of course, such a gas produces gas-filled cavities within the capacitor wherein static charges lead to further gas formation and eventual destruction of the capacitor.

It follows, naturally, that the impregnating composition disposed in the electrical field of a capacitor and acting as a dielectric is the weakest point in the capacitor dielectric with respect to the breakdown strength thereof. It is therefore important to distribute the impregnating agent throughout the dielectric foil and avoid localized concentrations thereof. One method of achieving such results is suggested by Behn et al. in co-pending U.S. Ser. No. 689,493 (filed Dec. 11, 1967, owned by the instant assignee and incorporated herein by reference) wherein at least a portion of the dielectric foil consists of a plastic material impregnated by a controllable amount of an impregnating agent.

Impregnating agents located in a space or gap between foils of a capacitor diffuse into the dielectric films. The films are thus caused to expand or swell and fill such gaps. The surface irregularities (i.e., projecting tips and pores therebetween) are somewhat eliminated during such an expansion process as the opposed surfaces are largely pressed flat against each other. The amounts of impregnating agent that diffuses within the foils does not cause serious loss of breakdown strength since the breakdown strength of oil layers tend to increase with decreases in the thickness thereof.

However, during the impregnation process, the impregnating agent (i.e., an oil) penetrates inwardly into a capacitor roll from the areas of contact therewith, i.e., the forward or front portions. Therefore, the initial swelling of the dielectric film takes place at such initial areas of contact or frontal portions. Such initial swelling is sufficiently great to close the interior passageways to the impregnating agent, preventing the subsequent flow or impregnation thereby into the roll interior. It is therefore highly desirable to control the rate of impregnation when impregnating agent at the areas of contact with dielectric films to allow complete impregnation of a capacitor roll body.

Accordingly, it is an important object of the invention to provide a method of controlled impregnation of a dielectric roll that prevents excessive swelling at the areas thereof initially contacted by the impregnating agent.

It is another important object of the invention to provide a method of treating a dielectric film roll prior to impregnation to allow substantially complete impregnation thereof by an impregnating agent.

Other objects, features and advantages of the invention will become more readily apparent from the following description of certain preferred embodiments thereof, although variations and modifications may be effected without departing from the spirit and scope of the novel concepts of the disclosure.

The instant invention achieves, in a general way, all of its objects by producing electrical capacitors wherein the dielectric films (i.e., plastic foils) are heat treated prior to impregnation by a suitable impregnating agent whereby the swelling capacity of the dielectric is reduced and simultaneously the absorption capacity is increased.

It has now been discovered that heat-tempering of dielectric films prior to impregnation by an impregnating agent materially reduces the swelling of dielectric films while increasing the absorption capacity of such dielectric films. Additionally, it has been also discovered that the swelling capacity of dielectric films is controllable by regulation of the extent and duration of the tempering process. Generally, the longer and more intense the tempering process, the greater the reduction in swelling capacity of the dielectric films. Of course, an increase in the absorption capacity of the film also takes place.

One of the more simple and convenient methods of tempering dielectric films is to temper them as roll bodies. The roll bodies may be supply rolls or ready-made capacitor rolls. An additional advantage in tempering ready-made capacitor rolls is that such capacitors are simultaneously dried. This is particularly advantageous in situations where paper films are rolled within the capacitor bodies.

As a result of tempering dielectric foils before impregnation, the swelling thereof is delayed and/or controlled. Apparently, tempering causes an expansion of all areas (solid and open) in a capacitor body thereby allowing a faster flow of impregnating agent to all portions of such capacitor bodies while retarding the diffusion of such agent into the interior of the films. In other words, the swelling rate of the dielectric film is reduced while its absorption rate is increased thereby allowing the impregnating agent to become substantially uniformly distributed throughout the dielectric films before the swelling of the films takes place. In order to close, or reduce in size, the spaces or gaps that remain open in the areas adjacent to the frontal or contacting surface of the dielectric films, the tempered capacitors are stored at room temperature. Further, an accelerated swelling is attained by a re-tempering or second tempering after the impregnation process. The swelling capacity is substantially increased by utilization of re-tempering temperatures of above about 70° C.

It is therefore a preferred procedure of the invention to (1) temper the dielectric films prior to impregnation to delay the swelling capacity while increasing its absorption capacity and (2) impregnate the tempered films at about room temperature, and then (3) re-temper the impregnated films (i.e., in the form of capacitor rolls), preferably at temperatures above about 70° C., to close the gaps or spaces in the roll area at the frontal portions thereof that may still be open. As will be appreciated, step (3) is not always necessary and in certain applications may be omitted. Further, the dielectrics are preferably first coiled into a roll body before tempering and maintained as a roll body throughout the entire procedure from steps (1) through (3). Application of higher temperatures during the re-tempering process increase the dielectric film thickness. As will be appreciated, the temperature can only be increased up to the maximum heat tolerance of the dielectric film.

For example, in electrical capacitors having dielectric films composed of polypropylene (a preferred plastic dielectric) and wherein the impregnating agent is an insulating oil containing a mixture of about 10 to 20% aromatic constituents, about 30% naphthenic constituents, and about 50 to 60% paraffinic constituents, the increase in thickness of the polypropylene film is less than 2% at room temperature after an 8 hour tempering process at 120° C. The increase of thickness in the dielectric film can be reduced further through additional tempering.

An insulating oil having the above composition and being suitable for use in the practice of the invention is available under the trade name "Shell K8." However, other impregnating agents may also be utilized.

As indicated hereinbefore, the intial tempering reduces the swelling capacity of the dielectric films while simultaneously increasing the absorption capacity thereof. This is particularly true of dielectric films wherein at least a portion thereof is composed of plastic, i.e., polypropylene. For example, a polypropylene film which has been impregnated with "Shell K8" subsequent to the tempering procedure for 8 hours at 120° C. shows a swelling of less than 4% at a 50° C. impregnation temperature and a swelling of about 8% at a 90° C. impregnation temperature. Further increases of the impregnation temperature (i.e., up to the maximum heat resistance of the dielectric) further increase the swelling of the film.

Since the initial tempering only reduces the swelling capacity but does not eliminate it, the dielectric film, after impregnation and through further heat treatment can be caused to expand or swell sufficiently so that any oil columns (or localized concentrations thereof) between the films are eliminated in accordance with the teachings of the aforesaid U.S. Ser. No. 689,493.

The invention is of particular utility in producing electrical capacitors having dielectrics consisting of independent plastic films and wherein an insert of insulating material, particularly paper, which has been metallized on both sides, functions as a capacitor element or plate. During the operation, a paper insert, i.e., an insulating material, is in the field-free space within the capacitor. A polypropylene film is an excellent dielectric for this type of capacitor.

The invention also has advantageous utility when the swelling of the dielectric films must be delay or prevented. The entire film is then treated at increased temperatures during a correspondingly longer period of time.

In summation, it will be seen that the invention provides a method of producing electrical capacitors, particularly an A.C. electrical capacitor having a dielectric and a cooperable capacitor element wherein the dielectric comprises, at least in part, an expandable plastic foil having an impregnating agent substantially uniformly distributed therein. The method of producing includes the steps of heat tempering the dielectric to reduce the swelling capacity while increasing its absorption capacity and then impregnating the dielectric with impregnating agents operable to expand the plastic foil whereby the impregnating agent is substantially uniformly distributed throughout the plastic foil and substantially eliminates any air space within the capacitor. An additional tempering step may be carried out after impregnation to cause additional swelling of the dielectric film and eliminate any localized concentrations of oil between the films or within the films and close any open gaps remaining in the capacitor body. The initial tempering process comprises heating the dielectric in the range of about 100 to 150° C. for at least about 5 hours. It will thus be seen that the invention meets all of the aforesaid objects by treating dielectric films of electrical capacitors in such a manner as to reduce the swelling capacity while increasing its absorption capacity to obtain uniform distribution of an impregnating agent therein and thereby produce improved electrical capacitors.

I claim as my invention:

1. A method of producing an electrical capacitor having a dielectric and a cooperable capacitor element, said dielectric consisting only of a plastic foil expandable by a liquid impregnating agent, comprising the steps of (1) heat-tempering said dielectric to a relatively high temperature below the maximum heat tolerance of said dielectric for a period of time sufficient to reduce the swelling capacity of said dielectric while substantially simultaneously increasing its absorption capacity; (2) impregnating said tempered dielectric at about room temperature with an impregnating agent operable to swell said dielectric, and (3) re-tempering said impregnated dielectric at a temperature below said relatively high temperature to accelerate swelling of said impregnated dielectric and substantially eliminate any air spaces within the capacitor.

2. A method as defined in claim 1 wherein step (1) consists of subjecting the dielectric to heat in the range of 100° to 150° C. for at least 5 hours.

3. A method as defined in claim 1 wherein the impregnating agent consists of a mixture of about 10% to 20% aromatic constitutents, about 30% naphthenic constituents and about 50% to 60% paraffinic constituents.

4. A method as defined in claim 1 wherein step (3) consists of subjecting the impregnated dielectric to a temperature of at least about 70° C.

5. A method of producing a dielectric capacitor having a dielectric and a cooperable capacitor element, said dielectric consisting only of a plastic foil expandable by a liquid insulating oil, comprising the steps of (1) heat-tempering said dielectric at a temperature in the range of about 100° to 150° C. for a period of time sufficient to reduce the swelling capacity of said dielectric while substantially simultaneously increasing its absorption capacity; (2) impregnating said dielectric at about room temperature with a liquid insulating oil operable to swell said dielectric; and (3) re-tempering said impregnated dielectric at a temperature above about 70° C. but below said heat-tempering temperature to accelerate swelling of said impregnated dielectric and substantially eliminate any air spaces within the capacitor.

6. A method as defined in claim 5 wherein the insulating oil consists of a mixture of about 10% to 20% aromatic constituents, about 30% naphthenic constituents and about 50% to 60% paraffinic constituents.

7. A method as defined in claim 5 wherein the dielectric is a polypropylene resin foil; step (1) consists of subjecting said dielectric to a temperature of about 120° C. for about 8 hours; step (2) consists of impregnating said dielectric at about room temperature with a liquid insulating oil consisting of a mixture of about 10% to 20% aromatic constituents, about 30% naphthenic constituents and about 50% to 60% paraffinic constituents; and step (3) consists of subjecting said impregnated dielectric to a temperature of about 90° C.

References Cited

UNITED STATES PATENTS

| | | | |
|---|---|---|---|
| 2,684,317 | 7/1954 | Burnham | 29—25.41 |
| 2,864,982 | 12/1958 | Ruscetta | 317—258 |
| 3,014,265 | 12/1961 | Ross | 29—25.41 |
| 3,078,207 | 2/1963 | Takahashi | 29—25.41X |
| 3,275,914 | 9/1966 | Hoffman | 317—258 |
| 3,363,156 | 1/1968 | Cox | 317—259 |
| 2,506,446 | 5/1950 | Dubilier | 29—25.42X |

JOHN F. CAMPBELL, Primary Examiner

R. B. LAZARUS, Assistant Examiner

U.S. Cl. X.R.

29—25.41